United States Patent [19] [11] 4,405,817
Murphy et al. [45] Sep. 20, 1983

[54] STABILIZED HYDROXYL TERMINATED REACTIVE LIQUID POLYMERS

[75] Inventors: Walter T. Murphy, Cuyahoga Falls; Clifford D. Guiley, Jr., Medina, both of Ohio

[73] Assignee: The B. F. Goodrich Company, Akron, Ohio

[21] Appl. No.: 258,979

[22] Filed: Apr. 30, 1981

[51] Int. Cl.$^3$ .................. C07C 29/64; C07C 67/62
[52] U.S. Cl. .................. 568/701; 524/319; 524/417; 524/421; 524/422; 560/4
[58] Field of Search .................. 568/701, 857; 560/2, 560/4, 224; 260/45.7 P, 45.7 ST, 45.85 R; 524/319, 417, 421, 422

[56] References Cited

U.S. PATENT DOCUMENTS

| | | | |
|---|---|---|---|
| 2,563,835 | 8/1951 | Gribbins et al. | 568/701 X |
| 2,703,792 | 3/1955 | Kropa et al. | 560/2 X |
| 3,014,064 | 12/1961 | Evenhius et al. | 568/701 X |
| 3,285,949 | 11/1966 | Moore et al. | 560/224 |
| 3,408,323 | 10/1968 | Hackney et al. | 560/2 X |
| 3,551,471 | 12/1970 | Siebert | 260/465.4 |
| 3,699,153 | 10/1972 | Siebert | 260/465.4 |
| 3,712,916 | 1/1973 | Siebert | 260/465.4 |
| 3,838,065 | 9/1974 | Lippert et al. | 568/701 X |

Primary Examiner—Natalie Trousof
Assistant Examiner—Vera C. Clarke
Attorney, Agent, or Firm—George A. Kap

[57] ABSTRACT

Shelf stability of hydroxyl terminated liquid polymers is vastly improved by mixing a strong inorganic or organic acid, therewith in order to adjust acid number thereof up to about 12. Amount of the acid used is less than 1% by weight of the liquid polymer.

3 Claims, No Drawings

STABILIZED HYDROXYL TERMINATED REACTIVE LIQUID POLYMERS

BACKGROUND OF THE INVENTION

Reactive liquid polymers have a hydrocarbon backbone with reactive groups in both terminal positions. Such liquid polymers are available with carboxyl, hydroxyl, vinyl, and amine reactive end groups. Some liquid polymers have pendant as well as terminal reactive groups.

These materials are 100% solids yet are in liquid state, contain no solvents, and have specific gravity of less than 1.0. Utility of reactive liquid polymers is largely accounted for by the reactive groups that can enter into reactions with other materials, as in a curing process that can involve chain extension and crosslinking to form solid elastomeric products.

Primary application of hydroxyl terminated reactive liquid polymers is as polyols in the formation of polyurethanes. In such reactions, a hydroxyl terminated liquid polymer is reacted with an organic polyisocyanate to form high molecular weight polyurethanes that find uses as mechanical parts in automotive, building, furniture and appliance industries.

One problem that has been observed in regards to hydroxyl terminated reactive liquid polymers is their instability on aging or their lack of shelf stability. For instance, a certain hydroxyl terminated polybutadiene liquid polymer had an original viscosity of 36,000 cps at 27° C. that increased to 62,400 cps at 27° C. after aging for 30 months at ambient conditions. This condition is unacceptable due to excessive viscosity that leads to processing problems and to undesirable changes in physical properties thereof.

Application Ser. No. 154,671 was filed on May 30, 1980, now abandoned, on behalf of inventors W. T. Murphy and C. D. Guiley, Jr. It is entitled "Process For Treating Hydroxyl Terminated Liquid Polymers" and discloses deactivation of hydroxyl terminated liquid polymers by treatment with an inorganic acid, such as phosphoric or sulfuric, before reacting it with an organic polyisocyanate to form high molecular weight polyurethanes. Without such deactivation, reaction products of a hydroxyl terminated liquid polymer and a polyisocyanate developed premature gellation and excessive exotherms.

SUMMARY OF THE INVENTION

Shelf stability of hydroxyl terminated liquid polymers is enhanced by treatment thereof with a strong acid, such as phosphoric or sulfuric, having an ionization constant in the range of about $1 \times 10^{-4}$ and greater. Amount of acid used should be sufficient to adjust the acid number of the hydroxyl terminated liquid polymer to not greater than 12. This amount of acid should be less than 1% by weight of the liquid polymer.

DETAILED DESCRIPTION

Carboxyl terminated liquid polymers, including polymers of poly(butadiene) and poly(alkyl acrylates) are known in the art. These carboxyl terminated liquid polymers are converted to hydroxyl terminated liquid polymers with a functionality of about 1.5 to practically 2, indicative of the fact that a hydroxyl group is located at each end of the polymer chain. This conversion can be accomplished, for example, by reaction of a liquid carboxyl terminated polymer with 3 to 10 parts per hundred of the liquid polymer of ethylene oxide in the presence of 0.01 to 0.3 parts of tertiary amine catalyst, in accordance with the teachings of U.S. Pat. No. 3,551,471. Catalysts that may be employed for the conversion of carboxyl terminated polymers to hydroxyl terminated polymers include tertiary, mono- and polyamines. Particularly preferred catalysts are trimethyl amine, triethyl amine, tributyl amine, triisoamyl amine, and the like. Triphenyl phosphine may be used. The reaction medium may be any solvent that will dissolve the carboxyl terminated polymers and the hydroxyl terminated polymer that is formed. Acetone, tertiary butanol, methyl ethyl ketone, cyclohexanone, cyclohexanol, tetrahydrofuran and dioxane are typical solvents that may be used. Optionally, the addition reaction may be run in a mass or bulk system with no solvent medium being employed. In such cases, ethylene oxide is preferably employed in excess. The carboxyl terminated liquid polymers normally have molecular weights in the range of about 400 to 8,000 and viscosities in the range of about 500 cps to 1,000,000 cps measured at 27° C. by type RVT Brookfield Viscometer.

Carboxyl terminated polymers of butadiene, and alkyl acrylates can be produced, for example, by the process taught in U.S. Pat. No. 3,285,949. Preferably, the desired monomers are placed in a solvent with a low chain transfer potential, preferably tertiary butanol, and a bis-azocyano acid initiator, preferably azodicyanovaleric acid. Polymerizations are run at 70°-90° C. Product polymer is coagulated with a solvent, such as methanol, and separated by decantation. When the liquid carboxyl terminated polymers are reacted with ethylene oxide, the oxirane ring of ethylene oxide is opened up by reaction with the terminal carboxyl groups on the chain to form terminal hydroxyl groups. Pendant carboxyl groups, if present, can likewise be reacted with ethylene oxide.

The hydroxyl terminated liquid polymers used in the preferred embodiment of this invention include hydroxyl terminated polybutadiene. Molecular weight of such preferred polymers is in the range of about 1500 to 4000. It appears, however, that hydroxyl terminated poly(butadiene-acrylonitrile) liquid polymers do not significantly benefit by the treatment with a strong acid as do the other hydroxyl terminated liquid polymers described herein.

The hydroxyl terminated liquid alkyl acrylate polymers, that also constitute a preferred embodiment of this invention, contain polymerized therein at least about 65 weight percent, more preferably at least about 85 weight percent, of at least one alkyl acrylate wherein the alkyl group contains from 3 to 10 carbon atoms, more preferably from 3 to 8 carbon atoms. The alkyl acrylate forms the backbone of the hydroxyl containing liquid polymer. Examples of suitable alkyl acrylates as the primary components of the polymer backbone include n-butyl acrylate, n-hexyl acrylate, 2-ethylhexyl acrylate, and the like, and mixtures thereof.

The hydroxyl terminated liquid polymers can also contain copolymerized therein at least one other unsaturated monomer, more preferably at least one other vinylidene monomer (i.e., a monomer containing at least one terminal $CH_2=C<$ group per molecule) in the polymeric backbone. Amount of comonomers can vary up to about 5%. Preferred vinylidene comonomers in the polymeric backbone include (a) dienes containing 4 to 10 carbon atoms such as butadiene-1,3, (b) vinyl nitriles such as acrylonitrile and methacrylonitrile and (c) other acrylates having the formula

wherein $R^1$ is hydrogen or an alkyl radical containing 1 to 3 carbon atoms, and $R^2$ is hydrogen or an alkyl radical containing 1, 2, or 11 to 18 carbon atoms, or an alkoxyalkyl, alkylthioalkyl, or cyanoalkyl radical containing 2 to 12 carbon atoms, more preferably 2 to 8 carbon atoms. Alternatively, $R^1$ may be an alkyl radical containing 1 to 3 carbon atoms and $R^2$ an alkyl radical containing 3 to 10 carbon atoms.

Other suitable vinylidene comonomers include (d) vinyl aromatics such as styrene, methyl styrene, and the like; (e) vinyl and allyl esters of carboxylic acids containing 2 to 8 carbon atoms, such as vinyl acetate, (f) vinyl and allyl ethers of alkyl radicals containing 1 to 8 carbon atoms, such as vinyl methyl ether, allyl methyl ether, and the like; and (g) monoolefins containing 2 to 14 carbon atoms, more preferably 2 to 8 carbon atoms, such as ethylene and propylene.

Existing processes for production of hydroxyl terminated liquid polymers are typically two-step, such as disclosed in U.S. Pat. Nos. 3,669,153 and 3,712,916. More recently, a one-step process was introduced which involves the use of a hydroxyl containing disulfide to produce hydroxyl terminated liquid polymers having sulfide linkages near the terminal portions of the polymer molecule. Some random hydroxyl functionality is also introduced by including small amounts of hydroxyl-containing monomers, such as 2-hydroxyethyl acrylate, in the monomer mixture.

Further improvement in the manufacture of the pendant and terminal hydroxylated liquid polymers is attained using a mixture of a small amount of at least one hydroxyl-containing trisulfide together with the hydroxyl-containing disulfide. Such disulfide-trisulfide mixture permits viscosity control during polymerization with substantially less disulfide required than if the disulfide were used alone, and the resulting hydroxylated polymers have less odor and discolor less upon heating than if the disulfide alone were used. Liquid polymers that have both terminal and pendant hydroxyl functionality total an average of about 1.4 to about 6 hydroxyl groups per molecule as well as sulfide and optionally disulfide linkages near the terminal portions of the polymer molecule.

Molecular weight, viscosity and other similar properties of the hydroxyl terminated liquid polymers will generally be the same as the carboxyl terminated liquid polymers from which the hydroxyl liquid polymers are prepared.

The acids that can be used to stabilize hydroxyl terminated liquid polymers against substantial increase in viscosity over an extended period of time are strong inorganic and organic acids having ionization constants in the range of $1 \times 10^{-4}$ and greater, preferably $1 \times 10^{-3}$ to $1 \times 10^{-1}$. Specific examples of preferred acids include phosphoric, sulfuric, pyrophosphoric, sulfurous and trichloroacetic. Phosphoric acid is used normally as an 85% solution and sulfuric acid is normally used as a 96% solution.

A convenient method to use in adding the acids to the hydroxyl terminated liquid polymers is a 1:1 by volume mixture with an inert solvent, such as acetone, and an amount of the mixture is added until the desired acid number is reached. The inert solvent should be a solvent for both the acid and the hydroxyl terminated liquid polymer. The acid number is determined by the ASTM D2849-69 test and represents milligrams of potassium hydroxide used to neutralize one gram of sample. It is determined by volumetric titration with a standardized potassium hydroxide solution. Of course, the strength of acid and amount of solvent may be varied, however, since the solvent should be removed before reaction of the treated hydroxyl terminated liquid polymer, and the amount of water and solvent should be kept to a minimum.

The acid number of the hydroxyl terminated liquid polymer being treated is to be adjusted to an acid number of a maximum of about 12, preferably 10 and below. The acid number should be adjusted by increasing the acid number of the untreated hydroxyl terminated liquid polymer by about 1 to 5 units, preferably about 2 to 4 units. Generally, sufficient acid is used so that viscosity of the hydroxyl terminated liquid polymer measured at 60° C. does not double when aged for 30 days at 60° C. Preferably, amount of the acid used should be sufficient to hold viscosity increase to 25% or less on samples aged at 60° C. for 30 days. Amount of acid should be a maximum of 1% by weight of the liquid polymer in the case of 96% sulfuric acid and 85% phosphoric acid.

As already disclosed, the acids used in treating the hydroxyl terminated liquid polymers are strong inorganic and organic acids, preferably inorganic acids such as phosphoric acid or sulfuric acid. Hydrogen chloride and nitric acid are not preferred because of high volatility, but can be used under proper conditions. Such acids as oxalic, succinic, acetic, glycolic, chlorosulphonic and the like are completely unsatisfactory in treating the hydroxyl terminated liquid polymers to stabilize their viscosity due to their low ionization constants.

In the practice of this invention, an acid number analysis is first performed on a lot of hydroxyl terminated liquid polymer. Phosphoric acid, supplied as the 85% solution and diluted 1:1 by volume with acetone, is added to the hydroxyl terminated liquid polymer with agitation. An amount of phosphoric acid that will increase the acid number by 1 to 5 units is essentially the optimum concentration sufficient to prevent substantial increase in viscosity with time. The amount of phosphoric acid needed is less than 1% of the hydroxyl terminated liquid polymer. To determine effectiveness, aging tests are conducted at ambient conditions or can be accelerated by running them at elevated temperature.

The following example further illustrates the invention disclosed herein with respect to a specific hydroxyl terminated liquid polymer and phosphoric acid as the stabilizing agent.

EXAMPLE 1

The liquid polymer used here was hydroxyl terminated reactive liquid polybutadiene that had a hydroxyl number (ASTM D2849-69) of 28.9, 0.056 equivalents of hydroxyl content per 100 parts of resin (ephr), and 0.005 ephr of carboxyl content. 250 grams thereof was mixed with 0.6 gram of commercial 85% phosphoric acid diluted 1:1 by volume with acetone. The treated sample and the untreated control sample were kept in capped glass jars and aged for 30 days in a 60° C. circulating air oven. Brookfield viscosity was measured on these samples before and after aging, with the following results:

|  | Control | H₃PO₄ Treated |
|---|---|---|
| Acid Number | 2.3 | 3.9 |
| Original Visc. @ 60° C., cps. | 4800 | 4720 |
| Aged Visc. @ 60° C., cps | 25,760 | 5,200 |

The results indicated above demonstrate an approximately 5-fold increase in viscosity of the control sample on aging for 30 days at 60° C. whereas the sample treated with phosphoric acid was quite stable showing only about a 10% increase. Furthermore, it was observed that the control sample darkened dramatically on aging while the treated sample remained unchanged. It is also important to emphasize that the dramatic improvement in aging properties was obtained without loss in mechanical properties in subsequent polyurethane applications.

We claim:

1. Stabilized hydroxyl terminated reactive liquid polymer selected from the group consisting of butadiene polymers and alkyl acrylate polymers containing sufficient amount of an acid with an ionization constant of $1 \times 10^{-4}$ and greater that inhibits viscosity increase with time.

2. Stabilized liquid polymer of claim 1 wherein said liquid polymer is selected from the group consisting of polybutadiene, and poly(alkyl acrylates) containing at least 65 weight percent of at least one alkyl acrylate wherein said alkyl group contains 3 to 10 carbon atoms; said acid is selected from the group consisting of phosphoric; sulfuric, pyrophosphoric, sulfurous, trichloroacetic, and mixtures of said acids; and amount of said acid being less than 1 weight percent of said liquid polymer.

3. Stabilized liquid polymer of claim 2 wherein said liquid polymer is polybutadiene and said acid is selected from the group consisting of phosphoric and sulfuric acids, said stabilized liquid polymer having an acid number not greater than 12.

* * * * *